L. WATKINS.
DIFFERENTIAL.
APPLICATION FILED OCT. 10, 1918.

1,328,217.

Patented Jan. 13, 1920.
3 SHEETS—SHEET 1.

WITNESSES

INVENTOR
Leigh Watkins
BY
ATTORNEYS

L. WATKINS.
DIFFERENTIAL.
APPLICATION FILED OCT. 10, 1918.

1,328,217.

Patented Jan. 13, 1920.
3 SHEETS—SHEET 2.

WITNESSES

INVENTOR
Leigh Watkins
BY
ATTORNEYS

L. WATKINS.
DIFFERENTIAL.
APPLICATION FILED OCT. 10, 1918.

1,328,217.

Patented Jan. 13, 1920.
3 SHEETS—SHEET 3.

WITNESSES

INVENTOR
Leigh Watkins
BY
ATTORNEYS

UNITED STATES PATENT OFFICE.

LEIGH WATKINS, OF OAKLAND, CALIFORNIA.

DIFFERENTIAL.

1,328,217. Specification of Letters Patent. Patented Jan. 13, 1920.

Application filed October 10, 1918. Serial No. 257,634.

*To all whom it may concern:*

Be it known that I, LEIGH WATKINS, a citizen of the United States, and a resident of Oakland, in the county of Alameda and State of California, have invented a new and Improved Differential, of which the following is a full, clear, and exact description.

This invention relates to differentials and has for an object the provision of an improved construction which may be used either as a rear or front driving differential on a four wheel driving vehicle.

Another object in view is to provide an improved construction in which the wheels connected with the differential may coast without operating the driving shaft or any of the machinery.

A further object of the invention is to provide a differential in which the usual arrangement of the internal gears and connecting members are eliminated and simple clutches substituted which may be manually actuated at the time that the clutch is thrown in and out or independent thereof for connecting and disconnecting the power shaft with the wheels.

In the accompanying drawings:

Fig. 6 is a detail perspective view of one of the clutch shifting arms embodying certain features of the invention.

Fig. 8 is a sectional view through Fig. 3 on line 8—8.

Figure 1:
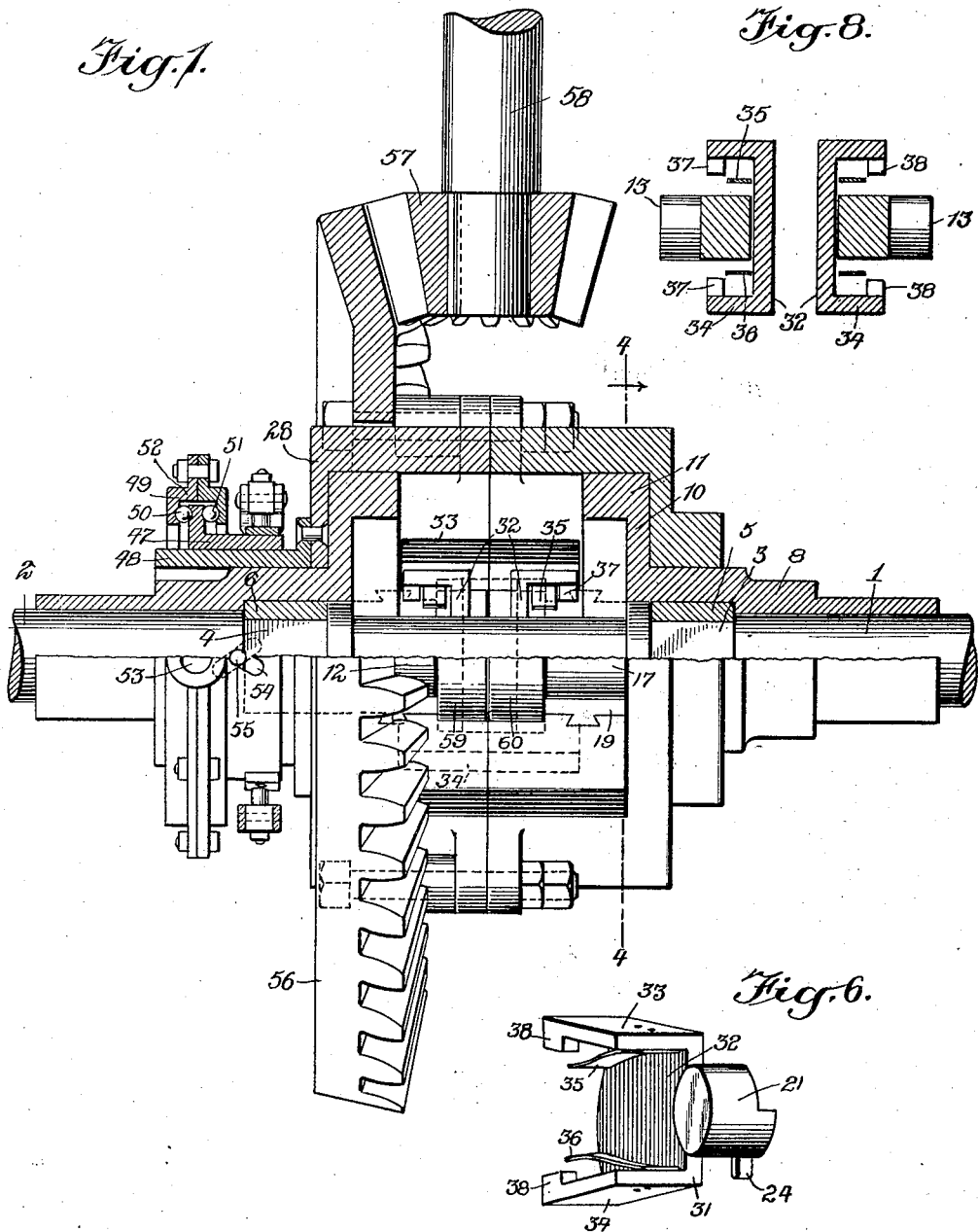
Figure 1 is a view of a differential disclosing an embodiment of the invention, same being shown partially in elevation and partially in section.
Figure 2:
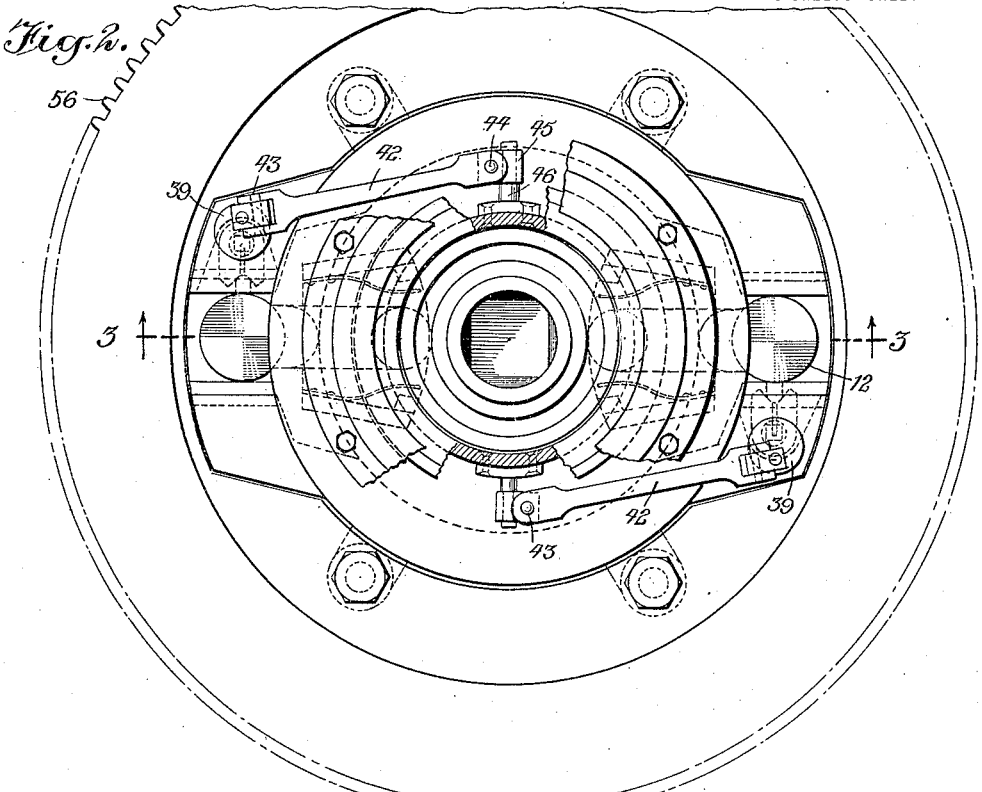
Fig. 2 is a side view of the structure shown in Fig. 1, the upper part being broken away.
Figure 3:
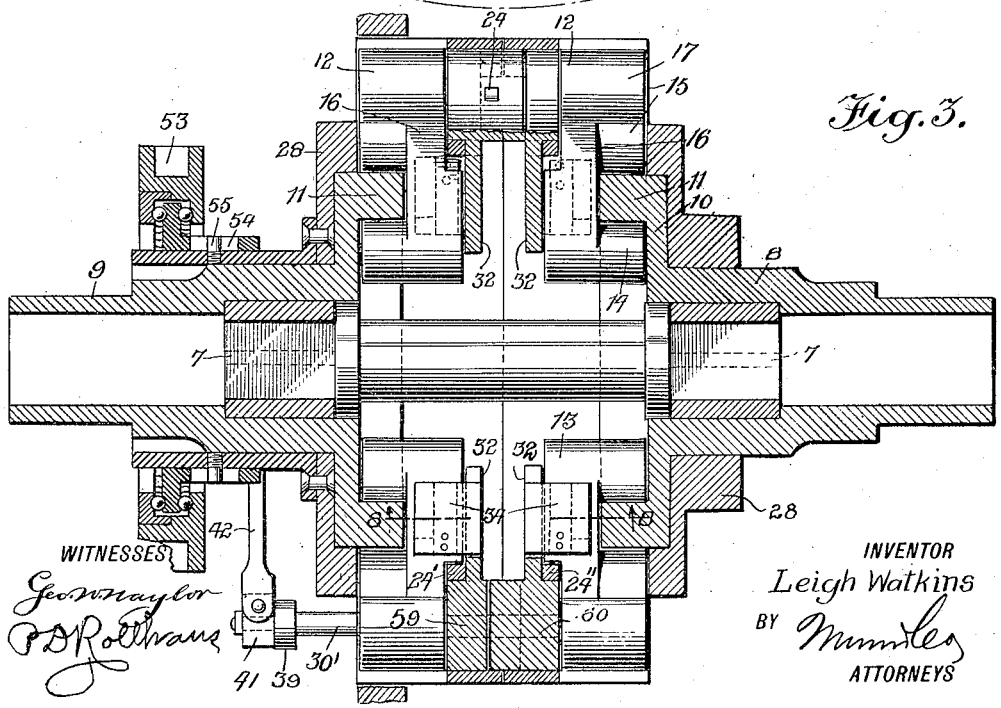
Fig. 3 is a section through Fig. 2 on line 3—3.
Figure 4:
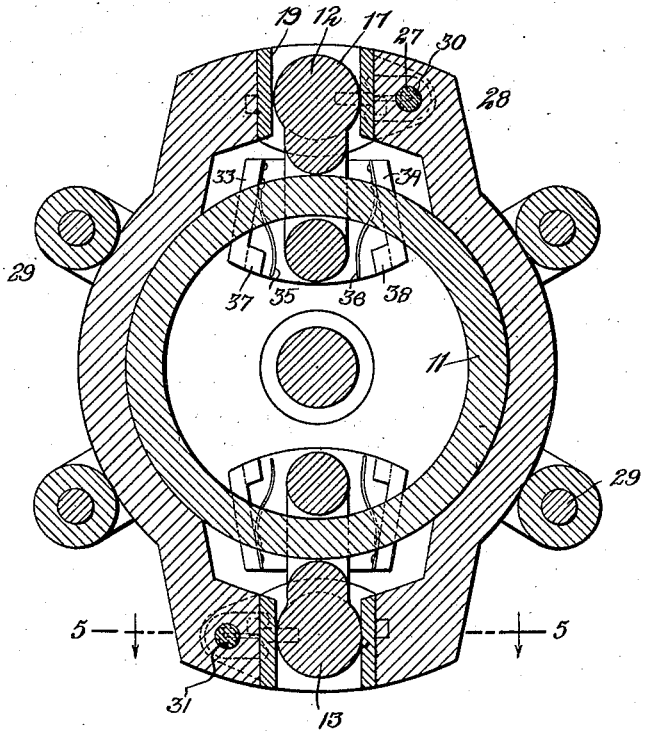
Fig. 4 is a sectional view through Fig. 1 on line 4—4.
Figure 5:
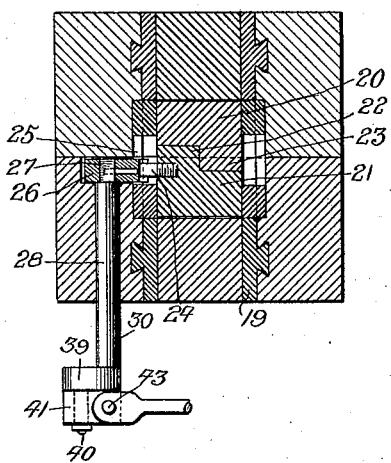
Fig. 5 is a sectional view through Fig. 4 on line 5—5.

Referring to the accompanying drawings by numerals, 1 and 2 indicate axles which are to be driven, as for instance the rear axles of an automobile. These axles are provided with square ends 3 and 4 fitting into sleeves 5 and 6, said sleeves being square interiorly and round exteriorly. A key 7 is provided for each of these sleeves for locking the same to the driving casings 8 and 9. The driving casings 8 and 9 are each provided with a disk shaped section 10 merging into an annular ring section 11 which coacts with the clutches 12 and 13. These clutches, as shown in Figs. 4 and 5 are loosely mounted in place and would fall by gravity except for the fact that the extending contact shoe 14 of each clutch overlaps ring 11 and also the respective contact shoe 15 overlaps the ring 11. These shoes are connected by a suitable connecting section or link 16 which merges into a bearing plate, said plate being rounded as shown at 17 in Fig. 4 so as to turn in the respective bearing boxes 19. These bearing boxes are preferably made of hardened steel so as to resist wear, though brass or other bearing boxes may be used if desired and renewed from time to time. A similar set of clutches and associate parts are provided for the casing 9 which coacts with the shaft 2, and as these parts are identical no additional description will be necessary, while the same reference numerals could be used for the same parts. In order, however, to connect the two clutches 12 a connecting clutch is provided as shown in Figs. 3 and 5, said clutch comprising clutch members 20 and 21 having overlapping extensions 22 and 23 whereby when the clutch member 21 is actuated power will be transmitted to the other clutch member. In order that power may be transmitted to the clutch member 22 a pin 24 is connected therewith which extends into a notch 25 formed in the arm or cam member 26 operating in the notched or cut out portion 27 of casing 28. Casing 28 is mounted to rotate on the casings 8 and 9, said casings being connected together by suitable bolts 29 as shown in Figs. 1, 2 and 4. A shaft 30 is usually secured to the arm or cam 26 for rocking the same at the proper time as hereinafter fully described.

When the arm or cam 26 is rocked the clutch member 21 will be rocked which will move clutch member 20 and consequently the movement will be transmitted to both of the clutches 12 simultaneously through a shifting structure 31 shown in Figs. 3 and 6. As shown in the lower part of Fig. 3 the clutch member 21 is provided with an integral extension 32 which merges into side members 33 and 34 (Fig. 6) which carry comparatively stiff springs 35 and 36 adapted to bear against the link or connecting section 16 of the respective clutches 12, so that when the clutch member 21 is shifted these members will be shifted and the shoes 14 and 15 caused to touch the respective rings 11. The side members 33 and 34 are provided with extensions 37 and 38 respectively which act as guides for the connecting members 16 of the clutches 12, though allowing said connecting portion a loose movement under the action of the springs 35 and 36. It will be noted that the clutch member 21 straddles one of the connecting portions 16 while the extension of the clutch member 20 straddles the opposite one, so that the single shaft 30 operating the clutch member 21 will operate both of these clutches simultaneously merely by swinging the pin 24. It will, of course, be understood that the swinging movement does not require much power as the parts as soon as brought into contact with the rings 11 will automatically engage them. When the power is connected for driving purposes these clutches will engage as just described, but in case of turning a corner either of the clutch members 12 will slip if either of the rings 11 moves faster than the driving mechanism or the opposite ring. Clutch members 13 and associate parts are identical with the clutch members 12 and associate parts so that the detail description of these clutches and the clutch members connecting the same will not be necessary.

In order to operate the pin 24 with the two connecting clutches the two shafts 30 and 30' are rocked, said shafts each carrying a disk 39 which have pins 40 eccentrically mounted thereon carrying pivotally mounted blocks 41 to which the respective connecting links 42 are pivotally connected at 43, said links being also pivotally connected at 44 to blocks 45 journaled on pins 46. The pins 46 are rigidly secured by rivets or any desired manner to an annular sleeve 47 (Fig. 1) which is slidingly and also rotatably mounted on the tubular extension 48 of casing 28. This sleeve is provided with an upstanding flange 49 having ball races in the opposite sides for receiving balls 50 and 51 held in the bearing casing 52. Bearing casing 52 is provided with oppositely positioned sockets 53 for receiving pins from a U-shaped shifting rod which may be operated by hand or may be connected to the clutch pedal of the automobile or other machine so as to be actuated automatically when the clutch is thrown in or out. The sleeve 47 is provided with a diagonal slot 54 which accommodates pin 55 which pin in turn is rigidly secured to the tubular extension 48.

By this construction and arrangement whenever the bearing casing 52 is shifted longitudinally of the shaft 2 sleeve 47 will be given a slight rotary movement and will consequently either push or pull on the connecting rods 42 whereby the container 39 and the respective shafts 30 and 30' will be rocked for turning the connecting pins 24 and cause the clutches 12 and 13 to engage the rings 11. In operation if the bearing casing 52 is operated manually said casing is actuated before the clutch of the automobile is thrown in so that the clutches 12 and 13 will be in engagement with the ring 11 before power is applied. After the parts have been thus brought into engagement the clutch of the automobile engine is thrown in and power is transmitted to the differential by rotating the shafts 1 and 2 which will continue to rotate and at the same speed provided the automobile is going straight ahead, but it will allow a slipping action of one set of clutches in case the automobile turns a corner.

In case the bearing casing 52 is connected with the clutch of the engine so as to be operated by the clutch pedal, the connection is preferably arranged so that the clutches 12 and 13 of the differential will be thrown in before the clutch of the engine, though this is not absolutely necessary, as the clutches of the differential will take hold even after power has been applied. In order to connect the power to the differential a beveled gear 56 is rigidly secured to the casing 28 in any desired manner and meshes with the pinion 57, keyed or otherwise rigidly secured to the driving shaft 58.

Referring to the pins 24 it will be seen from the bottom of Fig. 3 that bearing members 24' and 24'' are provided which are formed with projections or keys 59 and 60 fitting into suitable grooves in the casing 28 and these bearing members or boxes may be removed and renewed from time to time as necessary.

By providing the clutches 12 and 13 and associate parts when the engine is stopped and the automobile is allowed to coast the differential may be operated so as to be disengaged from the axles 1 and 2 which will allow these axles to rotate with the wheels without causing beveled gear 56, pinion 57, driving shaft 58 and associate parts to operate. In other words, the axles are disconnected completely from the power or power member and may freely coast which will give a better coasting action and at the same time eliminate appreciable wear on the driving mechanism.

Figure 7:
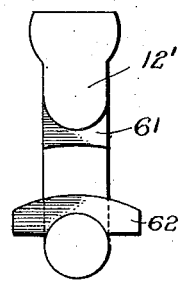
Fig. 7 is an edge view of a slightly modified form of clutch.

In Fig. 7 will be seen a slight modified form of clutch 12' wherein removable shoes 61 and 62 are provided, shoe 62 being of an appreciable length but having an arc-shaped upper surface conforming to the arc-shaped lower surface of shoe 61 whereby it will properly grip the ring 11. These shoes may be fastened rigidly in place or made removable, but preferably they are removably fastened in place, as for instance by some suitable screws, so that when the parts wear new ones may be supplied without any appreciable trouble.

What I claim is:

1. A differential for power vehicles comprising a pair of sleeves adapted to be connected with two of the wheels of the vehicle, a clutch for each of said sleeves adapted to interlock therewith when moved in one direction, a single means for actuating said clutches simultaneously, and means for connecting a power member to said clutches for moving same in a circle.

2. A differential for motor vehicles comprising a pair of driving sleeves having annular ring members, a plurality of clutches for each ring member, each of said clutches comprising a substantially U-shaped structure straddling the ring member and loosely fitting the same, a member arranged adjacent each of the clutches for swinging said clutches so as to engage the ring member, means for actuating said members, and means for connecting said clutches and said members with a power member.

3. A differential for power driven vehicles comprising a pair of power sleeves having ring members, a clutch for each of said ring members, each of said clutches being formed with shoes straddling said ring members, a casing surrounding said sleeves and supporting said clutches, a swinging member arranged adjacent each of said clutches for swinging the clutches so as to cause the shoes thereof to pinch the respective ring members, means for actuating said ring members, and a driving member connected with a source of power and with said casing for rotating the casing.

4. A differential for motor driven vehicles comprising a pair of power sleeves having annular flanges forming ring members, a straddling member straddling each of said ring members acting as a clutch, a swinging member having contact springs straddling part of each of said clutches for swinging the clutches to a clutched or unclutched position, means for actuating said swinging members, and means for connecting said clutches to said power member.

5. A differential for motor driven vehicles comprising a pair of ring members adapted to be connected with the wheels of the vehicle, a clutch for each of said ring members, a swinging member straddling each of said clutches for throwing the clutch into and out of engagement, connecting clutch members extending from said swinging members so that each pair of swinging members and clutches will be operated simultaneously, shifting mechanism for shifting said connecting clutches and said swinging members for throwing in and out the clutches coacting with said rings, and means for connecting said clutches with a power member, said means causing the clutches to move in a circle.

LEIGH WATKINS.